United States Patent [19]

DeSantis et al.

[11] Patent Number: 4,831,503
[45] Date of Patent: May 16, 1989

[54] MODULAR REAR DECK LIGHTING CLUSTER

[75] Inventors: Gerald J. DeSantis, Farmington Hills; Francisco X. Brentar, Ann Arbor, both of Mich.

[73] Assignee: ITT Corporation, New York, N.Y.

[21] Appl. No.: 100,043

[22] Filed: Sep. 23, 1987

[51] Int. Cl.$^4$ ............................................. B60Q 1/26
[52] U.S. Cl. ..................................... 362/80; 362/226; 362/240; 362/249; 362/365
[58] Field of Search .......................... 296/197; 340/87; 362/61, 80, 240, 249, 365, 226

[56] References Cited

U.S. PATENT DOCUMENTS 4,532,577  7/1985  Shelton .................................. 362/80

FOREIGN PATENT DOCUMENTS 2900124  7/1976  Fed. Rep. of Germany ........ 362/80
2576575  8/1986  France .................................. 362/80

Primary Examiner—Stephen F. Husar
Attorney, Agent, or Firm—James B. Raden

[57] ABSTRACT

A modular lighting cluster for attachment to the rear deck of an automotive vehicle includes a body member that houses the light assemblies associated with the rear of a vehicle, an electrical grid connecting the light assemblies into a light circuit and a connector for connecting the light circuit to the vehicle battery. Fastener assemblies are also associated with the body member for attaching it to the rear deck. A self-contained, easy to install module is thus provided.

8 Claims, 3 Drawing Sheets

MODULAR REAR DECK LIGHTING CLUSTER

BACKGROUND OF THE INVENTION

This invention relates to an arrangement for mounting rear deck components to automotive vehicles and, more particularly, to a modular rear deck lighting cluster.

When assembling automotive vehicles it is usual to individually mount numerous components and sub-assemblies to the rear deck of the vehicle, i.e., to the rear portion of the vehicle between the bumper and the trunk lid. Among these components and sub-assemblies are: various lights (brake lights, turn signal lights, back-up lights, and marker lights, running lights, license plate illumination lights) and their bulbs, reflectors, mounting sockets, wiring, connectors and lenses; license plate mounting assemblies; trunk lid locks; and seals. Because these parts are mounted individually at the vehicle assembly plant, significant time, labor and, thus, expense are required. In addition, ordering and storing these numerous parts adds to the inventory costs. Warranty costs too are added because of damage and malfunctions inherently resulting from the assembly of so many components.

SUMMARY OF THE INVENTION

It is an object of this invention to provide for the simple and economical assembly of rear deck components and sub-assemblies to the rear deck of a vehicle.

It is another object of this invention to provide a unitary rear deck module for vehicles that can be made by a supplier, tested and shipped as a single component to a vehicle assembly plant where by a simple assembly procedure, the module is mounted to a vehicle.

These and other objects of this invention are accomplished by providing a rear deck module in the form of an elongated body member adapted to fit across the rear deck of a vehicle. The body member carries a set of light assemblies on each end thereof and each set includes a plurality of lights. An electrical grid is connected with each light in the assemblies and also with a single electrical connector, carried by the body member, for connecting the grid and thus the lights to the wiring harness and battery of the vehicle. Locating means are provided on the body member for locating and guiding the module into alignment with the rear deck of a vehicle. Fastener assemblies are also provided on the body member for cooperation with fasteners on the vehicle for securing the module to a vehicle.

Each set of light assemblies includes brake lights, turn signal lights, back-up lights, side marker lights, running lights and license plate illumination lamps. The light assemblies also include lenses and these lenses are preferably removable. Suitable seals are also provided.

A license plate holder can be formed on the body member and a lock cylinder can be carried on the body member for locking a trunk lid in a conventional manner. In one form of the invention the license plate holder is integrally molded with the body member so that the license plate cannot be removed unless the trunk lid is open.

BRIEF DESCRIPTION OF THE DRAWING

For a better understanding of the invention reference is made to the following description of a preferred embodiment taken in conjunction with the figures of the accompanying drawing, in which.

DETAILED DESCRIPTION OF A PREFERRED EMBODIMENT

Figure 1:
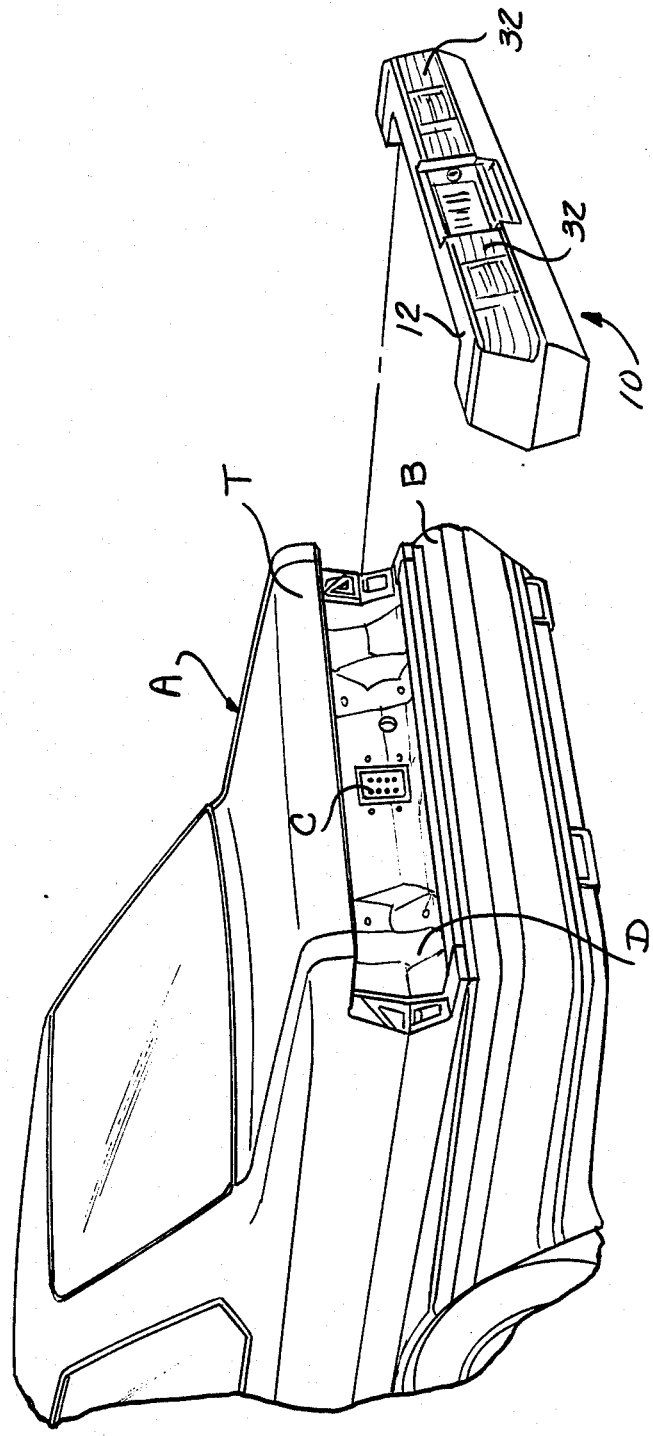
FIG. 1 is an exploded perspective view of a rear deck lighting module in accordance with this invention and of the rear of an automobile to illustrate how the module fits to a vehicle.

FIG. 1 illustrates the rear portion of an automobile A and a rear deck module 10 to be installed to it. The rear of the automobile A includes a rear bumper B and a trunk lid T as is usual. Between the bumper B and the trunk lid T is a recessed body portion or deck D extending fully across the back of the automobile A. If desired, the recessed body portion D can wrap around and extend for a short distance along the sides of the automobile A. As can be understood from FIG. 1, the module 10 is carried by the automobile A and fits in the recessed body portion D.

Figure 2:
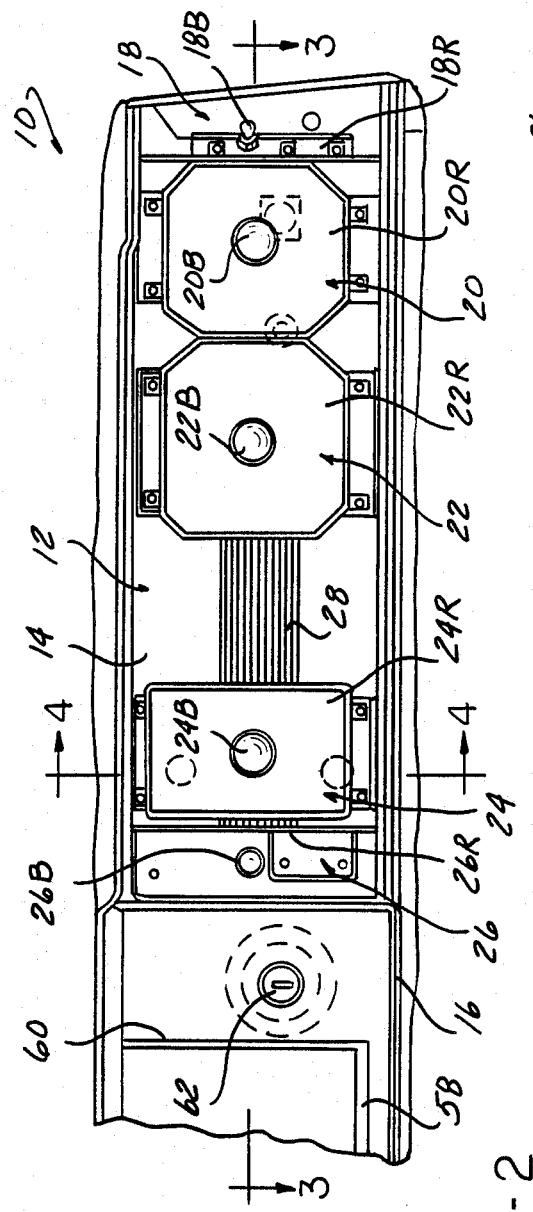
FIG. 2 is a front plan view of the right half of the module shown in FIG. 1 with the lens removed to illustrate the interior of the module.
Figure 3:
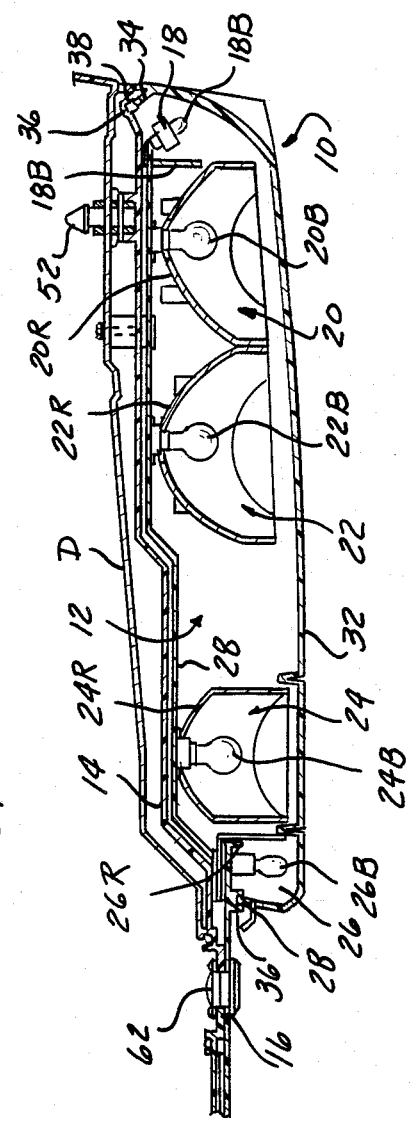
FIG. 3 is a longitudinal section view taken through the line 3—3 of FIG. 2 with the lens in place.
Figure 5:
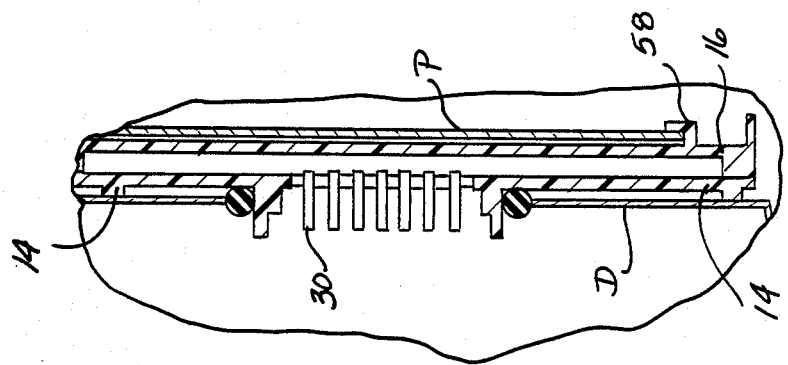

With reference to FIGS. 2 and 3 it can be seen that the rear deck module 10 comprises an elongated body member 12 made of plastic or other suitable material and includes a relatively thin back wall 14. The back wall has a length generally equal to the width of the automobile A and, thus terminates, adjacent the left and right hand sides of the automobile. The back wall 14 has a width generally equal to the distance between bumper B and trunk lid T. Thus dimensioned, the rear deck module 10 fits into the recessed body portion D. As seen in FIG. 2, the back wall 14 is formed with various angled portions so that it includes portions lying in different planes whereby it conforms to the configuration of the recessed body portion D. In a central region of the back wall 14 is a front wall 16 which may be integrally molded to the back wall or which, as shown herein, may be a separate plastic piece secured to the outer surface of the back wall, as seen in FIG. 5. Preferably, the front wall 16 is fused to the back wall 14 by a vibration welding or similar technique.

Adjacent each end of the body member 12 there are provided the various light assemblies usual for the rear of an automobile. As shown in FIGS. 2 and 3 and starting from the outer end of the body member, the following light assemblies are included: a side marker assembly 18; brake light assembly 20; turn signal light assembly 22; back-up light assembly 24; and a license plate illumination assembly 26. These light assemblies include a light bulb 18B, 20B, 22B, 24B and 26B, respectively, and the bulbs 20B and 22B associated with the brake and turn signal assemblies 20 and 22 are dual filament bulbs so that these bulbs can also function as the running lights.

As is usual, each bulb 18B, 20B, 22B, 24B and 26B is associated with a socket 18S, 20S, 22S, 24S and 26S, respectively, which sockets are carried by the back wall 14 by heat staking or in any other conventional manner. Suitable light reflectors are also provided. A reflective metal piece 18R is secured to the back wall 14 and extends generally perpendicular thereto at a point inward of the side marker bulb 18B to reflect its light outwardly. Similarly, a reflective metal strip 26R is secured to the back wall 14 and extends generally perpendicular thereto, but at a point outward of the license plate illumination bulb 26B to reflect light from that bulb inwardly to illuminate the license plate. The bulbs 20B, 22B, and 24B are associated with parabolic reflector housings 20R, 22R, and 24R, respectively, which surround their associated bulbs and reflect light. These reflector arrangements are generally known in the art and can be seen in more detail in FIG. 4. For ease of construction, the reflectors can be heat staked to the back wall 14 as shown at 25.

FIG. 3 most clearly shows an electrical grid 28 which is heat staked, riveted or otherwise conveniently secured to the back wall 14. The grid 28 is a stamped metal or other electrically conductive material that forms a part of the circuit in which the bulbs are associated. Thus, the electrical grid 28 includes input and output legs integrally formed with each socket in the layout of a suitable electrical circuit. The use of sheet metal grids is, per se, conventional in the art and need not be described in greater detail.

A single connector 30 is associated with the electrical grid 28 to connect it to a mating connector C in the deck D and, thus, to a wire harness in the vehicle and to the battery and switches needed to operate the lights. Thus all legs of the grid originate or terminate at a single location located generally at a central area on the back wall 14. As seen in FIG. 5, the electrical connector part 30 is in the form of a plurality of spring fingers extending inwardly from the back wall 14. The fingers mate with sockets in the connector part C.

When assembling the module 10 to the vehicle A, only a single connection need be made to electrically connect the light assemblies to these operating circuits on the vehicle.

Figure 4:
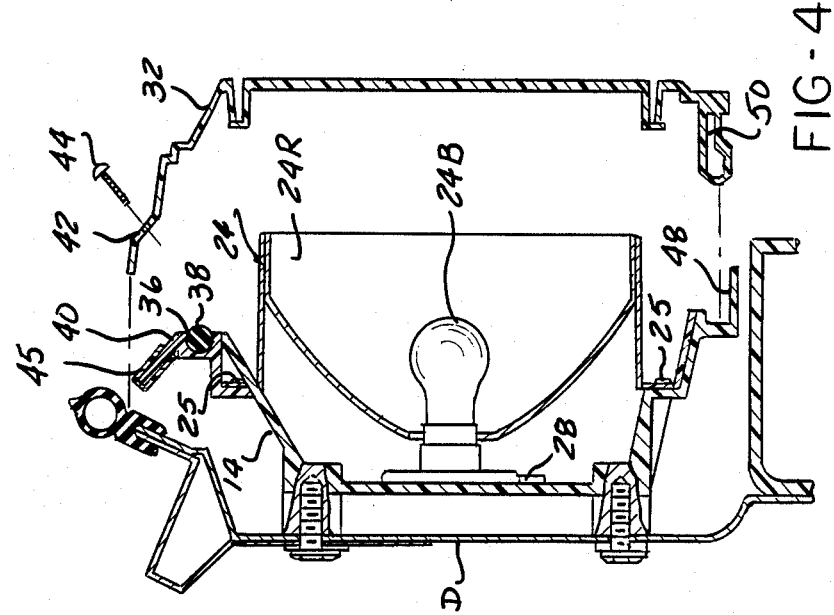
FIG. 4 is a section view taken along the line 4—4 of FIG. 2 and illustrating the manner of attaching the lens; and, FIG. 5 is a longitudinal section view taken along a line parallel to line 4—4 at the center of the module.

Two plastic lenses 32 are also provided across the outer face of the back wall 14 and cover each set of light assemblies. Each lens 32 is a plastic, multi-color single molded member in clear, red and amber colors at appropriate locations depending on the function of its adjacent light assembly. One single lens could also be used. In this embodiment the lenses are removable from the exterior of the vehicle to provide convenient access to the bulbs. As best seen in FIGS. 2, 3, and 4, each lens 32 is formed with a rib 34 adjacent its outer periphery which rib extends toward the back wall 14. The back wall 14 is formed with a groove 36 which receives the rib 34. A suitable elastic seal member 38 is located in the groove 38 or is fitted over the free end of the rib 34 so that when the rib seats in the groove a weathertight seal is provided for the light chambers formed. To secure the lens 34 to the back wall 14, it can be seen in FIG. 4 that the back wall is formed with an angled flange or lip 40 at its upper edge and that the lens 32 is formed with a similar lip 42. Holes are formed in aligned locations on the lips 40 and 42 and threaded fasteners 44 are threaded into a speed nut 45 carried on the lip 40. Still referring to FIG. 4, it can be see that the back wall 14 is formed with grooved sections 48 adjacent its lower edge. These grooved sections 48 receive snap tabs 50 formed on the lens.

The outer surface of the back wall is formed with locating pins 52 which have conical ends that are received in openings in the vehicle body (see FIG. 1) to locate the module 10. Suitable threaded fastener means including a plug unit 54 is carried on the back wall to receive a threaded pin member 56 and secure the module 10 to the body.

In accordance with another feature of this invention, the front wall 16 is formed with a generally U-shaped frame and includes a bottom leg 58 adjacent the bottom edge of the walls 14 and 16 and a pair of side legs 60, 60 extending from the bottom leg 58 to the top edge of the walls. In cross-section, the legs 58, 60, 60 have an L-shaped cross-section with one leg of the L overlying the outer surface of wall 16. This relationship is most clearly seen in FIG. 5 where leg 58 is shown in cross-section. Thus, the frame provides a holder for the license plate P as shown in FIG. 5. The top ends of the legs 60, 60 are, of course, open so that the license plate can be inserted. When the trunk lid T of the vehicle is closed, it overlies the top edge of the wall 16 and thus the open top edges of legs 60, 60 to preclude removal of the plate. With this arrangement, the license plate is retained without the need for fasteners and is retained in a manner that makes theft more difficult than with the conventional screw method.

As shown in FIGS. 2 and 3, the back wall 14 also carries the trunk lid lock cylinder 62. In this embodiment the lock cylinder 62 extends through the back wall 14 and front wall 16 into an opening in the trunk lid T so that it can cooperate with a mating lock portion in the vehicle body to lock the trunk lid in its closed position.

While in the foregoing, a preferred embodiment of the invention has been described, it should be understood that various modifications and changes can be made within the scope of the invention as recited in the appended claims.

What is claimed is:

1. A modular rear deck lighting cluster comprising an elongated body member having a back wall adapted to fit across the rear of a vehicle body, each end of said back wall having a set of light assemblies each comprising a plurality of lights extending from one surface, an electrical grid carried on said one surface and forming an electrical circuit including each of said lights, connector means carried by said back wall, said connector means being connected to said electrical grid and extending in a direction opposite that of said light assemblies, locating means and fastener means carried by said back wall and extending in the same direction as said connector means, and a lens means associated with said sets of light assemblies.

2. A modular rear deck lighting cluster in accordance with claim 1 wherein each set of light assemblies includes brake lights, turn signal lights, back-up lights, side marker lights and license plate illumination lights.

3. A modular rear deck lighting cluster in accordance with claim 1 wherein the lens means is secured to said body member by fasteners.

4. A modular rear deck lighting cluster in accordance with claim 1 wherein said electrical grid comprises a sheet metal stamping carried on said one surface of said back wall, said grid including integrally formed sockets for said lights.

5. A modular rear deck lighting cluster in accordance with claim 1 wherein each set of light assemblies includes reflectors associated with said lights.

6. A modular rear deck lighting cluster in accordance with claim 2 wherein a license plate holder is carried by said back wall between each of the license plate illumination lights, said license plate holder comprising a U-shaped member providing a frame for receiving a license plate.

7. A modular rear deck lighting cluster in accordance with claim 6 wherein said back wall carries a lock cylinder that extends therefrom in the same direction as said connector means.

8. A modular rear deck lighting cluster in accordance with claim 1 wherein said back wall includes a license plate holder and a lock cylinder.

* * * * *